United States Patent Office 3,379,293
Patented Apr. 23, 1968

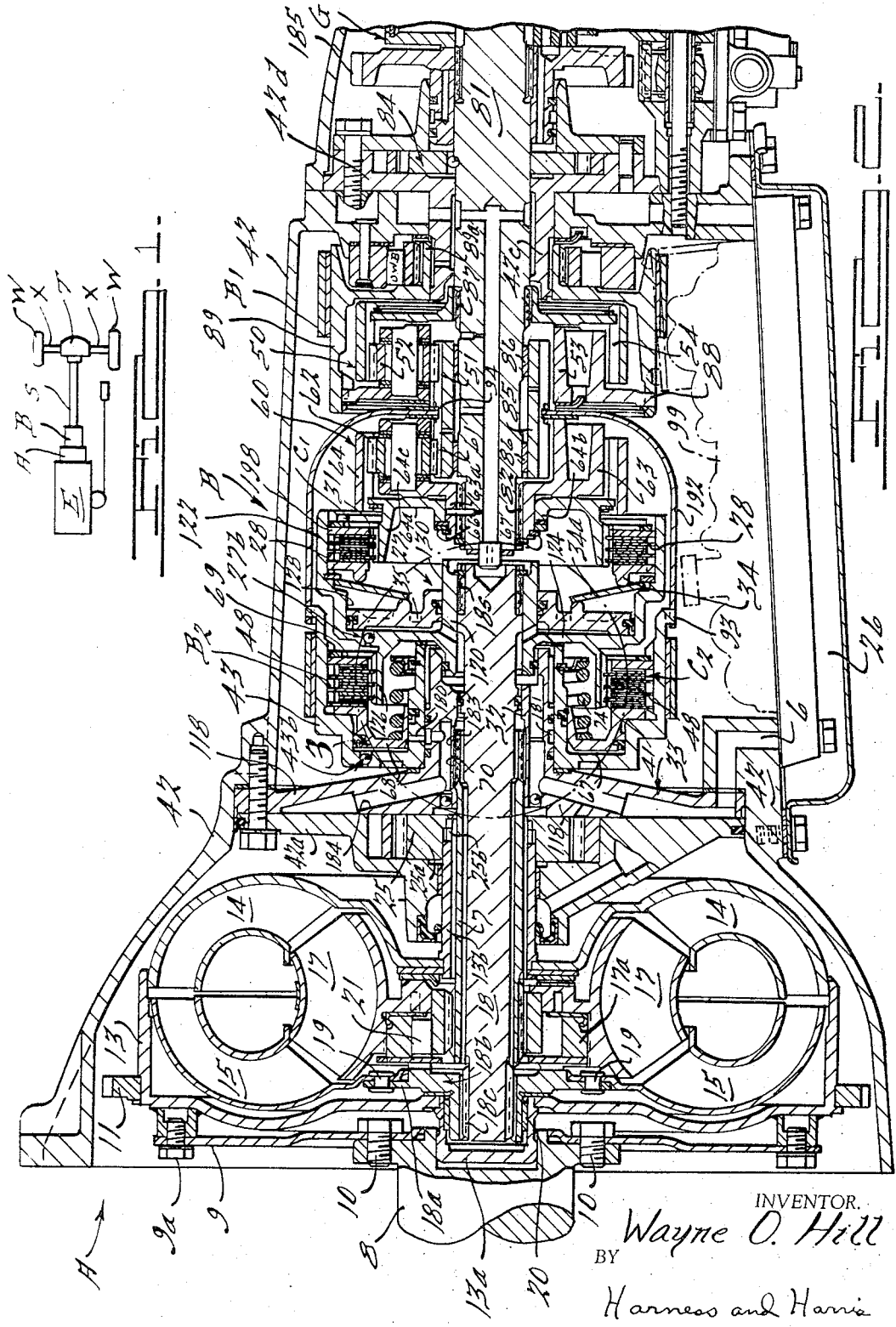

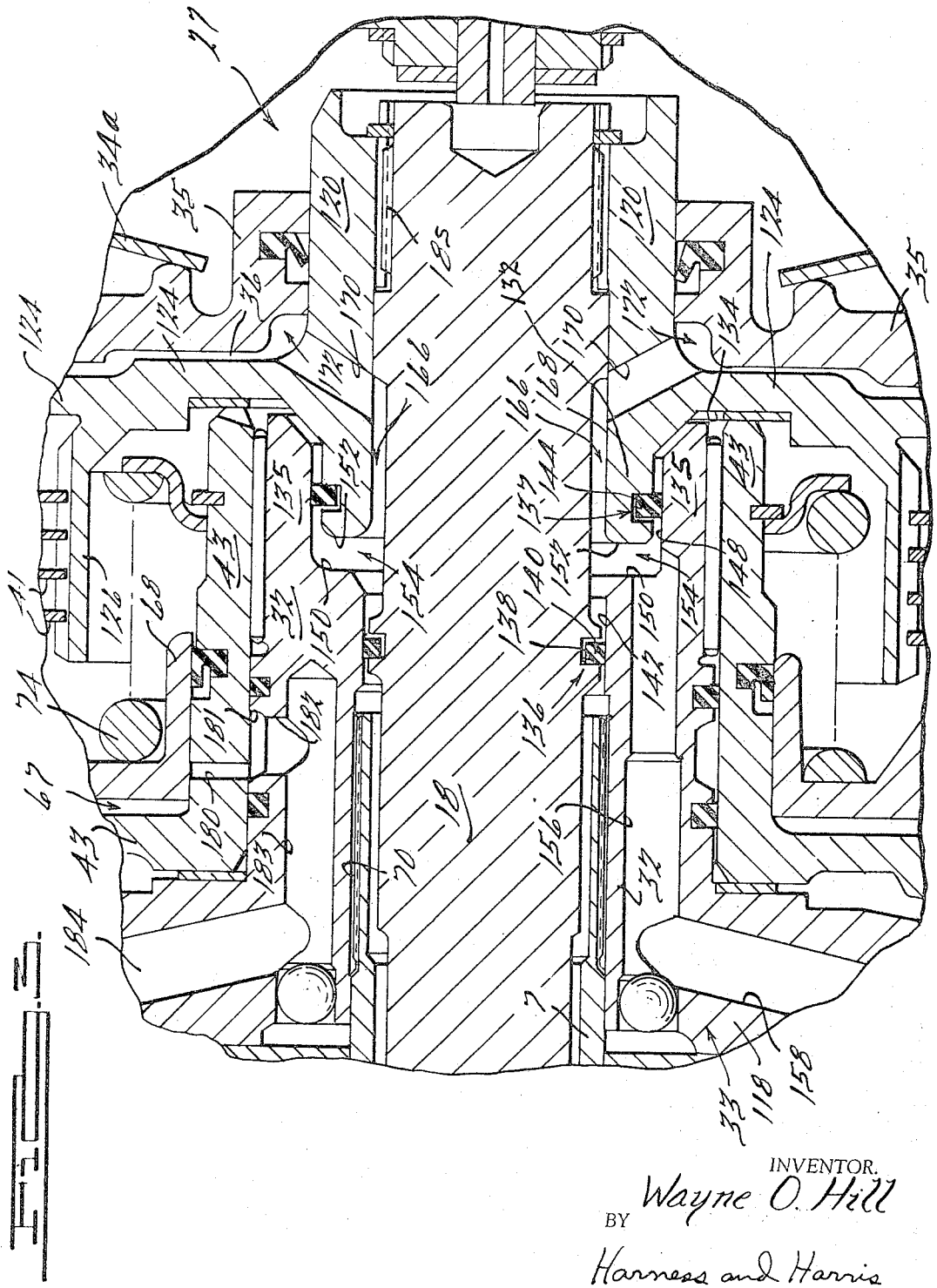

3,379,293
TRANSMISSION CLUTCH WITH HYDRAULIC SEALS
Wayne O. Hill, Detroit, Mich., assignor to Chrysler Corporation, Highland Park, Mich., a corporation of Delaware
Filed May 2, 1966, Ser. No. 546,798
7 Claims. (Cl. 192—85)

ABSTRACT OF THE DISCLOSURE

An automatic transmission for a motor vehicle in which the pressure fluid passageway to the forward clutch passes between a first relatively small diameter seal between the hub section of the main shaft bearing and the shaft, and a second relatively large diameter seal between a rearward lip extension of the hub section and a forward extension of the hub portion of the clutch drum, this arrangement preserving the structural integrity of the shaft and eliminating radial stacking or overlapping passageways to thereby minimize the external dimensions of the transmission.

---

This invention relates to a power transmission unit primarily intended for motor vehicle use. The transmission of the invention will function to automatically provide three different forward drive speeds and also a reverse drive. This invention is an improvement of the design shown in U.S. Patent No. 3,053,115.

It is an object of the present invention to provide a variable speed transmission having improved strength characteristics.

A more specific object is to provide a stronger variable speed transmission in which the additional strength is achieved without increasing the external dimensions of the overall transmission package.

Other objects and features of the invention will be apparent from the following detailed descritpion of a preferred embodiment of the invention and from the accompanying drawings wherein:

FIGURE 1 is a schematic view of a motor vehicle drive train that includes a power transmission unit according to the invention;

FIGURE 2 is a sectional elevational view of the power transmission unit utilized in the drive train of FIGURE 1; and FIGURE 3 is a view on an enlarged scale of the transmission structure within the circle 3 of FIG. 2.

FIG. 1 of the drawings diagrammatically discloses a motor vehicle power plant and drive train comprising an internal combustion engine E drivingly connected to a power transmission unit that consists of a hydrokinetic type of torque converter device A drivingly connected to a change speed gear box B. The output from gear box B drives a propeller shaft S that transmits drive through a differential unit T and axles X to the rear driving wheels W of the vehicle.

FIG. 2 shows details of the power transmission unit consisting of the torque converter device A and the change speed gear box B arranged in a series connected drive transmitting relationship. The reference numeral 8 represents an end portion of a driving member, such as the crankshaft of the engine E of the motor vehicle power plant. The shaft 8 is drivingly connected to a drive transmitting ring 9 by screw means 10. Drive transmitting ring 9 is drivingly connected by bolts 9a to the torque converter casing 13. Converter casing 13 has an engine starter ring gear 11 mounted on and extending about its periphery. Within the torque converter casing 13 are mounted the several vaned converter wheel elements; namely, the impeller or pump member 14, the turbine or runner member 15, and the guide or reaction member 17.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion 18a of a spider member 18b. Spider member 18b is drivingly connected by splines 18c to the forward end portion of the torque converter driven shaft member 18.

Shaft member 18 is adapted to transmit drive from the turbine member 15 of the torque converter device A to the planetary gearing of the gear box unit B that is arranged rearwardly of and in series with the torque converter device A. The converter driven shaft 18 thus provides the input shaft to the gear box B. The forward end of the shaft 18 is journalled in a bearing 20 that is piloted in an axially extending seat 13a formed in the hub of the torque converter casing 13. The rear end portion of converter driven shaft 18 is rotatably supported by the cylindrical hub section 32 of a bearing member 33. Bearing member 33 further includes a flange portion 118 which is clamped at its outer periphery between gear box casing 42 and casing front wall 42a.

The vaned converter guide wheel 17 is rotatably mounted within the converter casing 13 by means of the guide wheel hub portion 17a. Guide wheel hub portion 17a is supported by means of a one-way brake device 21 on an axially extending hollow sleeve 7 that is splined to cylindrical hub section 32 of bearing member 33 at 70.

The one-way brake 21 is arranged to permit only forward rotary movement (clockwise when looking from the converter A towards the gear box B) to be transmitted to the guide wheel 17 by the forward rotation of the impeller 14. The brake 21 prevents rotation of the guide wheel 17 in a reverse or counterclockwise direction. The one-way brake 21 herein disclosed may be any form of roller, sprag or similar type device.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26 through a supply conduit 6 formed in a thickened portion of casing 42. Pump 25 circulates this oil through the converter A, the transmission unit lubricating system and the various hydraulically operated control mechanisms (not shown) associated with this power transmission unit. A second pump 84, driven by the transmission output shaft 81, is also included in this transmission unit. The second pump 84 provides a second source of pressure fluid for operation of the various aforementioned hydraulically operated devices and insures a pressure fluid supply even at times when the engine driven pump 25 might not be operating.

The gear box B includes a forward drive clutch $C_1$, a direct drive clutch $C_2$, a pair of brake bands $B_1$ and $B_2$, a one way brake (O.W.B.), and a pair of planetary gear trains 50 and 60. These elements are adapted to cooperate with the torque converter device A to provide means for the transmission of three forward drives and a reverse drive to propeller shaft S. The forward drive clutch $C_1$, is engaged whenever any of the three forward speeds is being utilized and is disengaged when the transmission controls are set for either Neutral or Reverse. The direct drive clutch $C_2$ is engaged only when the 3rd or Direct forward speed is being transmitted or when Reverse drive is being transmitted. The different clutches and brakes that are applied for transmitting the several drive ratios obtainable with this transmission are set forth in the chart below—

| Drive ratio: | Members applied |
|---|---|
| Low (1st) | $C_1$ and $B_1$ or O.W.B. |
| Kickdown (2nd) | $C_1$ and $B_2$ |
| Direct (3rd) | $C_1$ and $C_2$ |
| Reverse | $C_2$ and $B_1$ |

The gear box B includes the housing 42 which may be considered to include front and rear portions. In the front portion of the housing 42 are located the clutches $C_1$ and $C_2$ whereas the rear portion houses the two planetary gears 50 and 60. The rear end of the converter driven gear box input shaft 18 may or may not pilot the forward end of the gear box output shaft 81 although such a connection is not shown in the disclosed form of this invention. Output shaft 81 has its rear end portion journalled in the sleeve portion 42c of the transmission housing rear wall 42d.

Transmission input shaft 18 is drivingly connected to a drum 27. Drum 27 includes a hub portion 120 splined at 18s to the free end of shaft 18, a rearwardly extending rim portion 122, an annular portion 124 interconnecting hub portion 120 and rim portion 122 and a flange portion 126 extending forwardly from annular portion 124. Flange portion 126 carries the friction clutch disc elements 41 of the reverse and direct drive clutch $C_2$. Clutch discs 41 are adapted to be drivingly engaged with clutch discs 48 drivingly connected to the interior surfaces of a brake drum 43. Brake drum 43 is journalled on the rearwardly projecting hub section 32 of bearing member 33. Brake band $B_2$ is arranged to be selectively applied to the brake drum 43 to prevent rotation thereof. Brake drum 43 mounts a backing plate 69 that cooperates with an axially shiftable piston 68 to effect drive transmitting engagement of the clutch discs 41, 48. Spring 74 normally urges the piston 68 forwardly to clutch disengaged position. Brake drum 43 includes a ball check pressure fluid bleed valve 43b that is speed responsive and arranged to prevent unintended engagement of the clutch $C_2$ by the centrifugal action of any fluid that may be trapped in the piston bore 67. Pressure fluid for operation of the clutch $C_2$ is supplied to the piston bore 67 through a radial bore 180 in the hub portion of brake drum 43, an external groove 181 in hub section 32 of bearing member 33, a radial bore 182 in hub section 32, an axial bore 183 in hub section 32, and a bore 184 extending generally radially in flange portion 118 of bearing member 33 for communication with sump 26. For purposes of clarity, bore 184 is shown in FIGS. 2 and 3 in a position angularly transposed from its true position.

Rim portion 122 of drum 27 has friction clutch discs 28 drivingly and shiftably mounted on its interior face. Clutch discs 28 are arranged to be drivingly engaged with clutch discs 31 carried by an axially extending projection 64c of the annulus gear 64 of the forwardly arranged planetary gear set 60. Clutch discs 28 and 31 are arranged to be drivingly compressed against a backing plate 32 by a pressure plate 34 actuated by a lever spring plate 34a. Lever spring plate 34a is operated by an annular piston 35 reciprocating in an annular cylinder bore formed by a cylindrical surface 128 on the inner periphery of rim portion 122 and cylindrical surface 130 on the outer periphery of hub portion 120. Drum 27 may mount a pressure fluid ball check bleed valve 27b that will prevent unintended engagement of the clutch $C_1$ by centrifugal force action on any fluid that might be trapped behind piston 35.

Arranged axially adjacent the forward drive clutch $C_1$ is the forwardly located planetary gear set 60. This gear set 60 comprises annulus gear 64, a sun gear 61, a planet pinion gearing 62 connecting gears 61, 64, and a planet pinion gear carrier 63 rotatably supporting the pinion gearing. Pinion gearing carrier 63 is splined to the output shaft 81 at 82. Annulus gear 64 is supported through its radially extending plate portion 64a on the hub 63a of the planet pinion gear carrier 63. The forward end of the hub portion 64b of the annulus gear 64 reacts against the rear end of a bearing ring 66 anchored to the pinion gear carrier hub 63a by the snap ring 67. This connection 67 prevents the transmission of thrust forces from gearing 50 to the input shaft 18 or to the clutches $C_1$ and $C_2$. The sun gear 61 is an integral part of a double sun gear sleeve 85. Sleeve 85 has the sun gear 61 formed on the front end thereof and the sun gear 51 of planetary gear set 50 formed on the rear end thereof. Sun gear sleeve 85 is journalled on the output shaft 81 by means of sleeve bearings 86.

The rearwardly located gear set 50 includes the sun gear 51, an annulus gear 54, a planet pinion gearing 52 that connects the gears 51, 54, and a planet pinion gear carrier 53 rotatably supporting the pinion gearing 52. Annulus gear 54 is drivingly connected to the output shaft 81 by splines 87. The spline connection 87 prevents the transmission of rearwardly directed, axial thrust forces from gearing 50 to the housing rear wall collar 42c. Pinion gear carrier 53 is drivingly connected at 88 to a brake drum 89 that is adapted to be engaged by the brake band $B_1$. Brake drum 89 has a hub portion 89a that is journalled on the forwardly projecting collar 42c of the rear wall 42d of the transmission housing 42. Hub portion 89a of the brake drum 89 is restrained against reverse rotation (counterclockwise when looking from the front toward the rear of the transmission) by means of the one-way brake device (O.W.B.), which may be a roller, sprag, or similar type of one-way device.

Interconnection between the two axially spaced adjacent gear sets 50, 60 is by way of the common sun gear sleeve 85 and by way of the dual connections of the front carrier 63 and the rear annulus gear 54 to the common output shaft 81.

A drum connector 192 is connected between the front brake drum 43 and the sun gear sleeve 85. Connector drum 192 is splined to the drum 43 at 93 and to the sun gear sleeve 85 at 94. Drum connector 192 is the means whereby the integral sun gears 51, 61 can be anchored against rotation when brake bank $B_2$ is applied to brake drum 43.

Mounted on the rear end of the output shaft 81 is rear oil pump and a sprag gear 185 that is adapted to be engaged by a parking sprag, not shown. Also mounted on the rear end of the output shaft 81 is the hydraulic governor device G that is a part of the transmission control system. This governor device may be of the type shown in U.S. Patent 2,697,363 to W. L. Sheppard.

The valve body 99 that includes the several fluid control mechanism for this automatic type of three forward speeds and reverse drive transmission is mounted in the transmission housing oil sump 26. This location makes it easy to adjust, repair, or replace the valve body 99 and also permit foreshortening of the transmission length.

With the aforedescribed gear box, when the transmission is set in Neutral, the hydraulic control systems (not shown) prevents the application of pressurized fluid to either of the clutches $C_1$ or $C_2$ or to either of the servos (not shown) that are used to apply the braking bands $B_1$ and $B_2$. When clutch $C_2$ is disengaged, the torque converter-driven, gear box input shaft 18 is disconnected from the gear box gear set 60 so there can be no drive input to either of the gear sets 50, 60 through the sun gears 51, 61 of the gear sets.

When the drive ratio selector elements (not shown) are set for the initiation of drive in the Drive ratio, the forward drive clutch $C_1$ is automatically engaged; this transmits drive to the gear box planetary input gear 64. Neither of the braking bands $B_1$ or $B_2$ nor the clutch $C_2$ is engaged at this time. The one-way brake O.W.B. prevents reverse rotation of the carrier 53 at this time and this one-way brake device provides the reaction for the compounded gear sets 50 and 60 which cooperate to transmit the one-way Low or first speed forward drive to the gear box output shaft 81. This Low speed drive passes from the input shaft 18 through the engaged clutch $C_1$ and then to the ring gear 64. Ring gear 64 acts on the planet pinion gears 62 and causes rotation of the sun gear 61 backwards because of the load on the output shaft 81 tends to anchor the planet pinion carrier 63 against rotation. Rotation of sun gear 61 backwards rotates the sun gear sleeve 85 and the other sun gear 51 backwards. The sun gear 51 rotating backwards acts on the planet pinions 52 and tends to rotate the pinion gear carrier 53 backwards because of the output shaft load on the ring gear 54. Due to the one-way brake device O.W.B., the carrier 53 cannot be rotated backwards and the pinion gears 52 are then active to drive the ring gear 54 and connected output shaft 81 forwardly. Due to the connection of both the carrier 63 and the ring gear 54 to the output shaft 81 and due to the anchoring of carrier 53 by brake O.W.B. at this time, part of the torque of the input shraft 18 is transmitted directly to the output shaft 81 by the planetary gear set 60 and the other part of the input shaft torque is delivered to the output shaft 81 through the compounded gear sets 50 and 60. The starting Low drive when the transmission is set for Drive, or any other forward drive ratio for that matter, thus passes through both of the gear sets 50 and 60 with the reaction normally provided by the one-way brake device O.W.B.

When Second speed is to be attained by an upshift from the starting Low, it is merely necessary to apply braking band $B_2$ while the forward drive Clutch $C_1$ remains engaged. This anchors the rotatable sleeve 85 that carries the sun gears 51 and 61. With sun gear 61 anchored the planetary gear set 60 is activated to directly transmit a two-way forward Second speed drive from ring gear 64 to pinions 62 to the output shaft 81 by way of the carrier 63. Planetary gear set 50 is inactive at this time and its pinion gear carrier 53 is driven forwardly at a speed which causes it to lift off and to overrun the one-way brake device O.W.B. Braking band $B_1$ and clutch $C_2$ remain disengaged when the transmission is conditioned for Second speed forward drive.

Third forward speed or direct drive is achieved by an upshift from Second that results from the engagement of the direct drive clutch $C_2$ at the time there is a release of band $B_2$. The forward drive clutch $C_1$ remains engaged when in Third forward speed while bands $B_1$ and $B_2$ are each released. Engagement of clutch $C_2$ while Clutch $C_1$ is engaged connects the ring gear 64 and the sun gear 61 of the planetary gear set 60 and this locks up to the gear set 60 for the transmission of a direct 1:1 forward drive. Locking up gear set 60 also locks up gear set 50 because of the interconnection between the several elements of these two gear sets.

Reverse drive is obtained by engaging the clutch $C_2$ and applying the brake band $B_1$ while the clutch $C_1$ is disengaged and the braking band $B_2$ is released. With clutch $C_1$ disengaged there is no drive input to the ring gear 64. Drive input is from the input shaft 18 through the clutch $C_2$ and drum 92 to the sun gear 51. As braking band $B_1$ is applied the carrier 53 is anchored and the output shaft mounted ring gear 54 is driven in a backwards or reverse direction by the gear set 50. Planetary 50 is thus effective to transmit the Reverse Drive.

For a coasting low speed ratio, for use as a brake, or for continuous low speed operation, the braking band $B_1$ can be applied at the same time that the one-way brake O.W.B. and the forward drive clutch $C_1$ are engaged.

For a coasting Second speed ratio, for use as a coast brake, for limiting the transmission to an automatic two-speed operation, or for effecting a downshift to Second speed drive from the Third speed or direct drive, the transmission control (not shown) that activates Second speed can be operated.

The control system for this transmission may include a manually operable drive ratio selector means such as that shown in Patent No. 2,989,958 to H. E. Scharfenberg. The remainder of the control system may be of the hydraulic type shown in Patent No. 3,000,230 to Leonard E. Froslie.

This invention concerns primarily the manner in which control fluid is routed to clutch $C_1$.

As best seen in FIG. 3, cylindrical hub section 32 of bearing member 33 extends rearwardly along shaft 18 to a location generally adjacent the forward face of the hub portion 120 of drum 27. Hub portion 120 includes a section 132 extending forwardly from the front face 134 of annular portion 124. The radially innermost portion of the rearward end of the cylindrical section 32 of bearing member 33 is cut away to provide an annular lip portion 135 which extends rearwardly from the main body portion of cylindrical section 32. Lip portion 135 encircles the forwardly extending section 132 of hub portion 120 to provide an annular overlap between bearing member 33 and drum 27.

A first fluid pressure seal 136 is provided between the main body portion of cylindrical section 32 and the adjacent surface of shaft 18 and a second fluid pressure seal 137 is provided between lip portion 136 and hub section 132.

Seal 136 includes an annular groove 138 formed in the outer peripheral surface of shaft 18 and a sealing ring 140 received in groove 138. Ring 140 is split and has a relaxed diameter greater than that of groove 138 so that it is continuously biased outwardly to sealingly bear against a cylindrical sealing surface 142 defined on the adjacent inner peripheral surface of the main body portion of cylindrical section 32.

Seal 137 includes an annular groove 144 formed in the outer peripheral surface of overlapped hub section 132 and a sealing ring 146 received in groove 144. Ring 146 is split and has a relaxed diameter greater than that of groove 144 so that it is continuously biased outwardly to sealingly bear against a cylindrical sealing surface 148 defined on the adjacent inner peripheral surface of lip portion 135. Cylindrical sealing surface 148 will be seen to be concentric with, but of a larger diameter than, cylindrical sealing surface 142. Rings 140 and 146 are preferably formed of steel and have a rectangular cross section.

In the assembled relation of bearing member 33 and drum 27, the face 150 of the annular shoulder connecting lip portion 135 to the main body portion of cylindrical section 32 is spaced forwardly from the forward annular face 152 of hub section 132 to define therebetween a radially extending annular passage 154.

An axial bore 156 in the cylindrical wall of the cylindrical section 32 opens at its rearward end in radial passage 154. The other end of bore 156 communicates with the inner end of a radial bore 158 in flange portion 118 of bearing member 33. The radially outer, or lower, end of bore 158 communicates with conduit 6 in casing member 142 which latter bore in turn selectively communicates with a sump 26. The selective communication of bore 6 with sump 26 is controlled in known manner by valve control unit 99.

Shaft 18 is necked down slightly rearwardly of seal 136 to provide an annular space or passage 166 between the outer peripheral surface of the shaft and the inner peripheral surface 168 of hub section 132. Annular passage 166 communicates at its forward end with radial passage 154 and at its rearward end with a bore 170 extending obliquely through hub portion 120 for communication with the piston chamber 172 defined between the forward face of piston 35 and the rearward face of annular portion 124 of drum 27.

Passages and bores 6, 158, 156, 154, 166, and 170 will be seen to together form a fluid pressure passageway extending from fluid pressure source 26, through bearing member 33, thence between seals 136, 138, and thence to chamber 172.

This arrangement replaces an arrangement whereby pressure fluid was routed to clutch $C_1$ by axial and transverse bores in shaft 18. These bores weakened the shaft and limited the amount of torque that it could safely transmit and thereby limited the size of engine with which any particular transmission could be coupled. In the fluid supply arrangement of the invention, the driving shaft is solid, thereby substantially improving the torque transmitting ability of the transmission, and yet the diameter of the gear box casing 42 is not increased so that the transmission hump in the forward floor of the passenger compartment may be maintained at a relatively small size and the transmission road clearance may be maintained at an acceptable value.

While a preferred embodiment of the invention has been illustrated and described in detail, it is to be understood that various changes may be made in the disclosed embodiment without departing from the scope or spirit of the invention as defined by the appended claims.

I claim:
1. A variable speed transmission for a motor vehicle comprising:
   (A) a transmission casing;
   (B) a central drive shaft extending axially rearwardly within said casing;
   (C) a drum within said casing having
      (1) a hub portion fixedly secured to said shaft,
      (2) a rim portion defining a cylindrical surface at its inner periphery, and
      (3) an annular portion interconnecting said hub and rim portions;
   (D) an annular piston encircling said shaft and slidably engaging at its outer peripheral surface said cylindrical surface;
   (E) clutch elements carried on said rim portion;
   (F) means operative in response to reciprocal movement of said piston to engage and disengage said clutch elements with and from coacting clutch elements carried by a transmission member to be driven from said drum;
   (G) a bearing member fixed with respect to said casing and having a generally cylindrical section journalling said shaft and extending rearwardly therealong to a location generally adjacent the forward face of the hub portion of said drum;
   (H) a source of pressurized fluid;
   (I) means defining a first fluid pressure seal along a first circular surface on said section concentric with the central axis of said shaft;
   (J) means defining a second fluid pressure seal along a second circular sealing surface on said section concentric with, but of a larger diameter than, said first surface;
   (K) means defining a fluid pressure passageway extending from said source, through said bearing member, thence between said seals and thence between said hub portion and said drive shaft to the fluid pressure chamber defined between said piston and said annular portion of said drum, whereby to establish pressure fluid communication between said source and said chamber to allow selective reciprocation of said piston to selectively actuate said clutch elements.

2. A variable speed transmission according to claim 1 wherein:
   (A) said hub portion includes a section extending forwardly from the front face of said annular portion;
   (B) the radially innermost portion of the rearward end of the cylindrical section of said bearing member is cut away to provide an annular lip portion which extends rearwardly from the main body portion of said cylindrical section and encircles the forwardly extending section of said hub portion to provide an annular overlap between said bearing member and said drum;
   (C) said first cylindrical sealing surface is cylindrical and is defined on the inner peripheral surface of the main body portion of the cylindrical section of said bearing member forwardly of said lip portion;
   (D) said second sealing surface is cylindrical and is defined on the inner peripheral surface of said lip portion.

3. A variable speed transmission according to claim 2 wherein
   (A) the inner peripheral surface of said lip portion and the inner peripheral surface on said main body portion are joined by an annular shoulder; and
   (B) in assembled relation of said bearing member and drum, the face of said shoulder is spaced forwardly from the forward annular face of the forwardly extending section of said hub portion, whereby to form a radially extending annular passage therebetween forming a part of said fluid pressure passageway.

4. A variable speed transmission according to claim 3 wherein said passageway further includes an axial bore in the cylindrical wall of the cylindrical section of said bearing member opening at its rearward end in said annular passage.

5. A variable speed transmission according to claim 3 wherein
   (A) said means defining said first seal includes
      (1) an annular groove formed in the outer peripheral surface of said shaft, and
      (2) a split sealing ring received in said groove and biased outwardly to bear against said first cylindrical sealing surface on said main body portion; and
   (B) said means defining said second seal includes
      (1) an annular groove formed in the outer peripheral surface of said forwardly extending hub section, and
      (2) a split sealing ring received in the last mentioned groove and biased outwardly to bear against said second cylindrical sealing surface on said lip portion.

6. A variable speed transmission according to claim 4 wherein
   (A) said shaft is necked down slightly rearwardly of the aforesaid sealing groove therein to provide an annular space between the outer periphery of said shaft and the inner periphery of said forwardly extending section of said hub portion, whereby to form an axially extending annular passage communicating with said radial passage.

7. A variable speed transmission according to claim 6, and further including a passage extending through said hub portion to establish fluid communication between said axially extending annular passage and said chamber.

References Cited

UNITED STATES PATENTS 3,307,430 3/1967 Bauder _____ 192—87.11 X
3,321,999 5/1967 Greer _____ 74—763

FOREIGN PATENTS 910,162 11/1962 Great Britain.

BENJAMIN W. WYCHE III, *Primary Examiner.*